US011950134B2

United States Patent
Zhang

(10) Patent No.: US 11,950,134 B2
(45) Date of Patent: Apr. 2, 2024

(54) METHOD AND DEVICE IN COMMUNICATION NODES FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 407 days.

(21) Appl. No.: 17/409,708

(22) Filed: Aug. 23, 2021

(65) Prior Publication Data

US 2022/0060939 A1   Feb. 24, 2022

(30) Foreign Application Priority Data

Aug. 24, 2020   (CN) .......................... 202010854341.0

(51) Int. Cl.
*H04W 28/06* (2009.01)

(52) U.S. Cl.
CPC .................................. *H04W 28/06* (2013.01)

(58) Field of Classification Search
CPC ...... H04W 28/06; H04W 76/22; H04W 76/40
See application file for complete search history.

(56) References Cited

U.S. PATENT DOCUMENTS

2021/0218503 A1* 7/2021 Babaei .................. H04L 1/1861
2022/0217506 A1* 7/2022 Xu .......................... H04W 4/06

* cited by examiner

*Primary Examiner* — Mandish K Randhawa

(57) ABSTRACT

The present disclosure discloses a method and a device in communication nodes for wireless communications. In a first node, a successful transmission of a first packet is acknowledged by a first entity, the first entity being used for unicast; a second entity being used for non-unicast does not indicate that the second entity deletes a duplicated first packet; the second entity being used for unicast indicates that the second entity deletes a duplicated first packet; herein, the first entity and the second entity are associated with a same higher layer entity. The present disclosure helps avoid deleting a same packet repeatedly transmitted through multicast, thus ensuring the continuity of traffics received by multicast, which further reduces higher layer retransmissions triggered by deletion of the packet, thus decreasing traffic delay.

20 Claims, 5 Drawing Sheets

METHOD AND DEVICE IN COMMUNICATION NODES FOR WIRELESS COMMUNICATION

CROSS REFERENCE TO RELATED APPLICATIONS

This application claims the priority benefit of Chinese Patent Application No. 202010854341.0, filed on Aug. 24, 2020, the full disclosure of which is incorporated herein by reference.

BACKGROUND

Technical Field

The present disclosure relates to transmission methods and devices in wireless communication systems, and in particular to a transmission scheme and device in wireless communications relating to multicast and broadcast.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

The technique of broadcast/multicast transmission is now widely applied in cellular networks, such as Multimedia Broadcast Multicast Service (MBMS) provided in the 4G Long Term Evolution (LTE) system. A major feature of the broadcast/multicast transmission is that the network equipment can transmit the same broadcast/multicast data to multiple terminal nodes simultaneously, thus playing an important role in scenarios of broadcast televisions, disaster warning, emergency services, industrial control and vehicle-to-everything. In LTE MBMS, an eNB employs a Physical Downlink Control Channel (PDCCH) to schedule multiple terminal nodes to receive a Physical Downlink Shared Channel (PDSCH) or a Physical Multicast Channel (PMCH) that contains broadcast/multicast data. A broadcast/multicast-related identifiers comprise Single Cell RNTI (SC-RNTI), Single Cell Notification RNTI (SC-N-RNTI) and Group RNTI (G-RNTI).

A topic for discussion in a Work Item (WI) of NR Multicast approved at the 3GPP RAN #86 Plenary meetings is to study a method of swift conversion between Point-to-Point (PTP) transmission and Point-to-MultiPoint (PTM) transmission. To support the rapid change from PTP to PTM and from PTM to PTP, a feasible scheme is to configure two corresponding RLC entities for a same PDCP entity, one used for broadcast multicast and the other for unicast. The networks can decide whether to solely employ unicast or broadcast multicast, or both ways for data transmission flexibly according to information such as network payload and user mobility.

SUMMARY

Inventors find through researches that there is still no solution to how to manage a packet in multicast link after successful transmission of a packet in unicast link.

To address the above problem, a scheme is proposed by the present disclosure. It should be noted that, though only the scenario of communications between a network device and a terminal is stated above as an example, the present disclosure is also applicable to other scenarios like terminal-terminal communications, where similar technical effects will be achieved. Additionally, the adoption of a unified solution for various scenarios (including but not limited to network device-terminal and terminal-terminal communications) contributes to the reduction of hardcore complexity and costs. The embodiments of the first node of the present disclosure and the characteristics in the embodiments may be applied to a second node if no conflict is incurred, and vice versa. In the case of no conflict, the embodiments of the present disclosure and the characteristics in the embodiments may be combined with each other arbitrarily.

In one embodiment, interpretations of the terminology in the present disclosure are given referring to definitions in TS36 series of 3GPP specifications.

In one embodiment, interpretations of the terminology in the present disclosure are given referring to definitions in TS38 series of 3GPP specifications.

In one embodiment, interpretations of the terminology in the present disclosure are given referring to definitions in TS37 series of 3GPP specifications.

In one embodiment, interpretations of the terminology in the present disclosure are given referring to definitions in the specification protocols of the Institute of Electrical and Electronics Engineers (IEEE).

The present disclosure provides a method in a first node for wireless communications, comprising:
  a successful transmission of a first packet being acknowledged by a first entity, the first entity being used for unicast;
  an instance when a second entity is used for non-unicast does not indicate that the second entity deletes a duplicated first packet; an instance when the second entity is used for unicast indicates that the second entity deletes a duplicated first packet;
  herein, the first entity and the second entity are associated with a same higher layer entity.

In one embodiment, the first entity is an RLC entity, and the second entity is an RLC entity, and the higher layer entity is a PDCP entity.

In one embodiment, the phrase of the first entity being used for unicast includes that any higher layer packet transmitted through the first entity is identified by a unicast index.

In one embodiment, the phrase that a second entity is used for non-unicast includes that any higher layer packet transmitted through the second entity is identified by a non-unicast index.

In one embodiment, the phrase that the second entity is used for unicast includes that any higher layer packet transmitted through the second entity is identified by a unicast index.

In one embodiment, the non-unicast refers to at least one of groupcast, broadcast or multicast.

In one subembodiment of the above embodiment, the unicast index is a Cell RNTI (C-RNTI).

In one subembodiment of the above embodiment, the unicast index comprises 16 bits.

In one subembodiment of the above embodiment, the non-unicast index is a Group RNTI (G-RNTI).

In one subembodiment of the above embodiment, the non-unicast index comprises 16 bits.

In one embodiment, the phrase that the first entity and the second entity are associated with a same higher layer entity comprises that the same higher layer services are transmitted on the first entity and the second entity.

In one embodiment, the phrase that the first entity and the second entity are associated with a same higher layer entity comprises that for any higher layer packet that is respectively transmitted through the first entity and the second entity, the higher layer packet has a same sequence number in the first entity and the second entity.

In one subembodiment, the higher layer packet is a PDCP Data PDU, and the sequence number of the higher layer packet in the first entity and the second entity is indicated by a PDCP SN field in a PDCP Data PDU.

Specifically, according to one aspect of the present disclosure, the above method is characterized in comprising:

the first transmitter, in which an instance when the second entity is used for unicast and when the second entity and the first entity correspond to a same UE indicates that the second entity deletes the duplicated first packet.

In one embodiment, the phrase that the second entity and the first entity correspond to a same UE comprises that the first entity and the second entity respectively belong to two serving cells comprised in different Cell Groups (CGs) of a same user.

In one embodiment, the phrase that the second entity and the first entity correspond to a same UE comprises that the first entity belongs to a serving cell in a Master Cell Group (MCG), while the second entity belongs to a serving cell in a Secondary Cell Group (SCG).

In one embodiment, the phrase that the second entity and the first entity correspond to a same UE comprises that the first entity and the second entity belongs to two serving cells in a same CG of a same user.

Specifically, according to one aspect of the present disclosure, the above method is characterized in that the first entity and the second entity being associated with a same higher layer entity comprises that:

for any higher layer packet that is respectively transmitted through the first entity and the second entity, the higher layer packet has a same sequence number in the first entity and the second entity.

In one embodiment, the higher layer packet is a PDCP Data PDU, and the sequence number of the higher layer packet in the first entity and the second entity is indicated by a PDCP SN field in a PDCP Data PDU.

Specifically, according to one aspect of the present disclosure, the above method is characterized in that the second entity and the first entity corresponding to a same UE comprises that:

any higher layer packet transmitted through the first entity and any higher layer packet transmitted through the second entity are identified by a same unicast index.

In one embodiment, the unicast index is a C-RNTI.

The present disclosure provides a first node for wireless communications, comprising:

a first receiver, in which a successful transmission of a first packet is acknowledged by a first entity, the first entity being used for unicast;

a first transmitter, in which an instance when a second entity is used for non-unicast does not indicate that the second entity deletes a duplicated first packet; an instance when the second entity is used for unicast indicates that the second entity deletes a duplicated first packet;

herein, the first entity and the second entity are associated with a same higher layer entity; the first entity is an RLC entity, and the second entity is an RLC entity, and the higher layer entity is a PDCP entity.

In one embodiment, the present disclosure is advantageous in that upon reception of the indication that a packet has been successfully transmitted through unicast, there will be no need to delete a duplicate packet transmitted through multicast, thus ensuring the continuity of traffics received by multicast; furthermore, higher layer retransmissions triggered by packet deletion can be reduced, hence less traffic delay.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
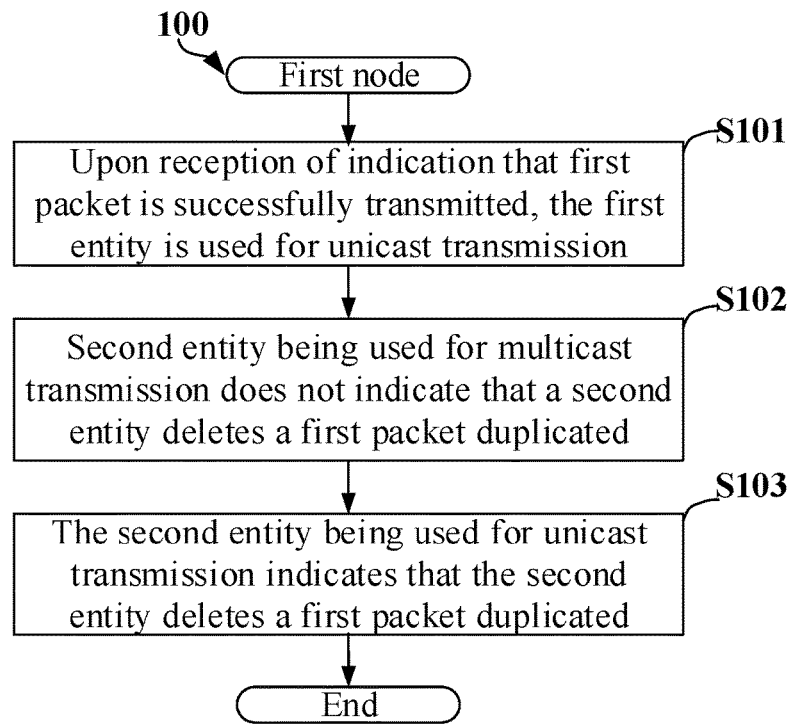
FIG. 1 illustrates a flowchart of processing of a first node according to one embodiment of the present disclosure.

Embodiment 1 illustrates a flowchart of processing of a first node according to one embodiment of the present disclosure, as shown in FIG. 1. In FIG. 1, each box represents a step. Particularly, the sequence of steps marked by these boxes does not necessarily represent specific chronological order of each step.

In Embodiment 1, the first node in the present disclosure: in step S101, a successful transmission of a first packet is acknowledged by a first entity, the first entity being used for unicast; in step S102, a second entity being used for non-unicast transmission does not indicate that the second entity deletes a duplicated first packet; in step S103, a second entity being used for unicast transmission indicates that the second entity deletes a duplicated first packet;

herein, the first entity and the second entity are associated with a same higher layer entity.

In one embodiment, the first packet is a higher layer packet.

In one embodiment, the first packet is a Protocol Data Unit (PDCP PDU).

In one embodiment, the first packet is a PDCP Data PDU.

In one embodiment, the first packet is a Service Data Unit (RLC SDU).

In one embodiment, the first packet is an SDU.

In one embodiment, the first packet is a PDU.

In one embodiment, the first packet is duplicated, and the duplicated first packet is submitted to the first entity and the second entity.

In one embodiment, the first packet is duplicated by the higher layer entity associated with the first entity and the second entity.

In one embodiment, the first packet and the duplicated first packet comprise a same PDCP Data PDU.

In one embodiment, the first packet and the duplicated first packet comprise a same PDCP PDU.

In one embodiment, the first packet and the duplicated first packet comprise a same PDU.

In one embodiment, the first packet and the duplicated first packet comprise a same PDCP SDU.

In one embodiment, the first packet and the duplicated first packet comprise a same SDU.

In one embodiment, the first packet and the duplicated first packet share a same Sequence Number (SN).

In one embodiment, the SN of the first packet and the duplicated first packet is a PDCP SN.

In one embodiment, the first packet and the duplicated first packet comprise the same contents.

In one embodiment, the first packet and the duplicated first packet are processed by a same key.

In one embodiment, the first packet and the duplicated first packet are processed by different keys.

In one embodiment, the duplicated first packet is a PDCP PDU.

In one embodiment, the duplicated first packet is a PDCP Data PDU.

In one embodiment, the duplicated first packet is an RLC SDU.

In one embodiment, the duplicated first packet is an SDU.

In one embodiment, the duplicated first packet is a PDU.

In one embodiment, the first packet is transmitted through the first entity.

In one embodiment, the first packet being transmitted through the first entity comprises that the duplicated first packet is transmitted through the first entity.

In one embodiment, the phrase that a successful transmission of a first packet is acknowledged by a first entity comprises that a positive acknowledgment of the first packet is received by the first entity.

In one embodiment, the phrase that a successful transmission of a first packet is acknowledged by a first entity comprises that when a positive acknowledgment of the first packet is received by the first entity, the first entity transmits first information to a higher layer, the first information indicating a successful transmission of the first packet.

In one subembodiment, the phrase of the first information indicating a successful transmission of the first packet comprises that the fact that the first information indicates the successful transmission of the first packet is acknowledged by a first entity.

In one embodiment, the phrase that a successful transmission of a first packet is acknowledged by a first entity comprises that the higher layer entity associated with the first entity and the second entity receives first information transmitted by the first entity, the first information indicating a successful transmission of the first packet.

In one embodiment, the phrase that a successful transmission of a first packet is acknowledged by a first entity comprises that second information is received through a first entity, and the second information indicates that the first packet is received.

In one embodiment, the second information is transmitted by a counterpart entity of the first entity, and the second information indicates that the first packet is received by the counterpart entity of the first entity.

In one embodiment, the phrase of a successful transmission of the first packet comprises that the first packet is completely received.

In one embodiment, the phrase of a successful transmission of the first packet comprises that the first packet is completely received by a counterpart entity of the first entity.

In one embodiment, the first entity is an RLC entity.

In one embodiment, the second entity is an RLC entity.

In one embodiment, the higher layer entity associated with the first entity and the second entity is a PDCP entity.

In one embodiment, the first entity is an RLC entity, and the second entity is an RLC entity, and the higher layer entity is a PDCP entity.

In one subembodiment, the higher layer entity is a transmitting PDCP entity.

In one embodiment, the first entity is an Acknowledged Mode (AM) RLC entity.

In one embodiment, the first entity is a transmitting side of an Acknowledged Mode (AM) RLC entity.

In one embodiment, the first entity is an Unacknowledged Mode (UM) RLC entity.

In one embodiment, the first entity is a transmitting Unacknowledged Mode (UM) RLC entity.

In one embodiment, the second entity is an Acknowledged Mode (AM) RLC entity.

In one embodiment, the second entity is a transmitting side of an Acknowledged Mode (AM) RLC entity.

In one embodiment, the second entity is an Unacknowledged Mode (UM) RLC entity.

In one embodiment, the second entity is a transmitting Unacknowledged Mode (UM) RLC entity.

In one embodiment, the first entity is an Acknowledged Mode (AM) RLC entity, and the second entity is an AM RLC entity.

In one embodiment, the first entity is a PDCP entity, and the second entity is a PDCP entity.

In one embodiment, the higher layer entity is a SDAP entity.

In one embodiment, the non-unicast refers to a transmission mode other than unicast.

In one embodiment, the non-unicast refers to at least one of groupcast, broadcast or multicast.

In one embodiment, the phrase of the first entity being used for unicast includes that the first entity belongs to a Data Radio Bearer (DRB).

In one embodiment, the phrase of the first entity being used for unicast includes that the first entity belongs to a unicast RLC bearer.

In one embodiment, the phrase of the first entity being used for unicast includes that the first entity is mapped to a Dedicated Traffic Channel (DTCH).

In one embodiment, the phrase that the second entity is used for non-unicast includes that the second entity belongs to a Multicast Radio Bearer (MRB).

In one embodiment, the phrase that the second entity is used for non-unicast includes that the second entity belongs to a Multicast RLC Bearer.

In one embodiment, the phrase that the second entity is used for non-unicast includes that the second entity belongs to a non-unicast RLC bearer.

In one embodiment, the phrase that the second entity is used for non-unicast includes that the second entity is mapped to a Multicast Traffic Channel (MTCH).

In one embodiment, the phrase that a second entity is used for non-unicast includes that the second entity is mapped to a Multicast Broadcast Service Traffic Channel (MBSTCH).

In one embodiment, the phrase that a second entity is used for non-unicast includes that the second entity is mapped to a Multicast Broadcast Service Channel (MBSCH).

In one embodiment, the phrase that the second entity is used for unicast includes that the second entity belongs to a Data Radio Bearer (DRB).

In one embodiment, the phrase that the second entity is used for unicast includes that the second entity belongs to a unicast RLC bearer.

In one embodiment, the phrase that the second entity is used for unicast includes that the second entity is mapped to a Dedicated Traffic Channel (DTCH).

In one embodiment, the phrase of the first entity being used for unicast includes that the first entity is a DRB.

In one embodiment, the phrase of the first entity being used for unicast includes that the first entity is a unicast RLC bearer.

In one embodiment, the phrase that the second entity is used for non-unicast includes that the second entity is a Multicast Radio Bearer (MRB).

In one embodiment, the phrase that the second entity is used for non-unicast includes that the second entity is a multicarrier RLC bearer.

In one embodiment, the phrase that the second entity is used for non-unicast includes that the second entity is a non-unicast RLC bearer.

In one embodiment, the phrase that the second entity is used for unicast includes that the second entity is a DRB.

In one embodiment, the phrase that the second entity is used for unicast includes that the second entity is a unicast RLC bearer.

In one embodiment, the phrase of the first entity being used for unicast includes that any higher layer packet transmitted through the first entity is identified by a unicast index.

In one subembodiment, the unicast index is a C-RNTI.

In one subembodiment, the unicast index comprises 16 bits.

In one subembodiment, a number of bits comprised in the unicast index is a positive integral multiple of 8.

In one subembodiment, the unicast index is used for CRC scrambling of any higher layer packet transmitted through the first entity.

In one subembodiment, the unicast index is used for determining time-frequency resources occupied by any higher layer packet transmitted through the first entity.

In one subembodiment, the unicast index is used for generating an RS sequence of DMRS of any higher layer packet transmitted through the first entity.

In one embodiment, the phrase of the first entity being used for unicast includes that any higher layer packet transmitted through the first entity is transmitted on a DTCH.

In one embodiment, the phrase that the second entity is used for non-unicast includes that any higher layer packet transmitted through the second entity is identified by a non-unicast index.

In one subembodiment, the non-unicast index is a G-RNTI.

In one subembodiment, the non-unicast index is a SC-RNTI.

In one subembodiment, the non-unicast index is a SC-N-RNTI.

In one subembodiment, the non-unicast index comprises 16 bits.

In one subembodiment, a number of bits comprised in the non-unicast index is a positive integral multiple of 8.

In one subembodiment, the non-unicast index is used for CRC scrambling of any higher layer packet transmitted through the second entity.

In one subembodiment, the non-unicast index is used for determining time-frequency resources occupied by any higher layer packet transmitted through the second entity.

In one subembodiment, the non-unicast index is used for generating an RS sequence of DMRS of any higher layer packet transmitted through the second entity.

In one subembodiment, the phrase that the second entity is used for unicast includes that any higher layer packet transmitted through the second entity is identified by a unicast index.

In one subembodiment, the unicast index is a C-RNTI.

In one subembodiment, the unicast index comprises 16 bits.

In one subembodiment, a number of bits comprised in the unicast index is a positive integral multiple of 8.

In one subembodiment, the unicast index is used for CRC scrambling of any higher layer packet transmitted through the second entity.

In one subembodiment, the unicast index is used for determining time-frequency resources occupied by any higher layer packet transmitted through the second entity.

In one subembodiment, the unicast index is used for generating an RS sequence of DMRS of any higher layer packet transmitted through the second entity.

In one embodiment, the phrase that the first entity and the second entity are associated with a same higher layer entity comprises that the same non-unicast traffics are transmitted on the first entity and the second entity.

In one embodiment, the phrase that the first entity and the second entity are associated with a same higher layer entity comprises that the same unicast traffics are transmitted on the first entity and the second entity.

In one embodiment, the phrase that the first entity and the second entity are associated with a same higher layer entity comprises that the same higher layer traffics are transmitted on the first entity and the second entity.

In one embodiment, the phrase that the first entity and the second entity are associated with a same higher layer entity comprises that any higher layer packet transmitted through the first entity is transmitted through the second entity.

In one subembodiment, the higher layer packet is a PDCP PDU.

In one subembodiment, the higher layer packet is a PDCP Data PDU.

In one embodiment, the phrase that the first entity and the second entity are associated with a same higher layer entity comprises that for any higher layer packet that is respectively transmitted through the first entity and the second entity, the higher layer packet has a same sequence number in the first entity and the second entity.

In one subembodiment, the higher layer packet is a PDCP Data PDU, and the SN of the higher layer packet in the first entity and the second entity is indicated by an PDCP SN field in a PDCP Data PDU.

In one embodiment, the present disclosure is advantageous in that by receiving an indication that a unicast transmitted packet is transmitted successfully, one can avoid deleting the same packet repeatedly transmitted through multicast, thus ensuring the continuity of traffics received through multicast; in addition, higher layer retransmissions triggered by packet deletion can be reduced, thereby decreasing the traffic delay.

Embodiment 2

Figure 2:
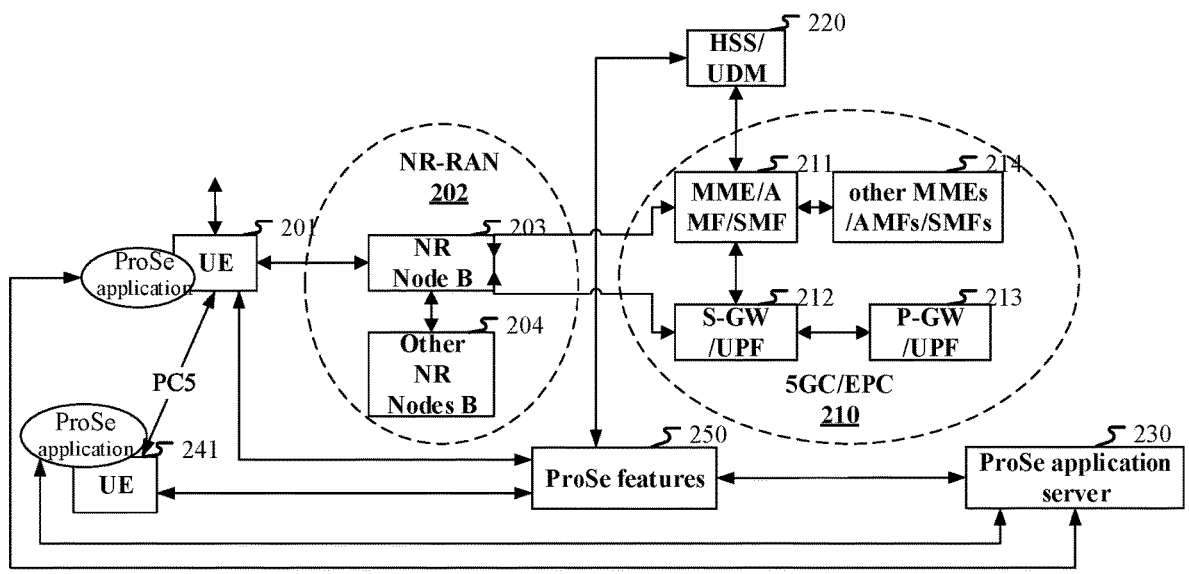
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System/Evolved Packet System (5GS/EPS) 200 or other appropriate terms, which may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted equipment, vehicle-mounted communications units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE 201 and the gNB203 are connected by a Uu interface.

In one embodiment, the gNB204 and the gNB203 are connected by a Xn interface.

In one embodiment, the gNB204 and the gNB203 are connected by a X2 interface.

In one embodiment, a radio link from the UE201 to the NR Node B is an uplink.

In one embodiment, a radio link from the NR Node B to the UE201 is a downlink.

In one embodiment, the first node and the second node in the present disclosure are the UE201 and the gNB203, respectively.

In one embodiment, the UE 201 supports sidelink transmission.

In one embodiment, the UE 201 supports a PC5 interface.

In one embodiment, the UE 201 supports a Uu interface.

In one embodiment, the UE 201 supports relayed transmission.

In one embodiment, the gNB203 supports a Uu interface.

In one embodiment, the gNB203 supports Integrated Access and Backhaul (IAB).

In one embodiment, the gNB203 is a Marco Cellular base station.

In one embodiment, the gNB203 is a Micro Cell base station.

In one embodiment, the gNB203 is a PicoCell base station.

In one embodiment, the gNB203 is a Femtocell.

In one embodiment, the gNB203 is a base station supporting large delay difference.

In one embodiment, the gNB203 is a flight platform.

In one embodiment, the gNB203 is satellite equipment.

Embodiment 3

Figure 3:
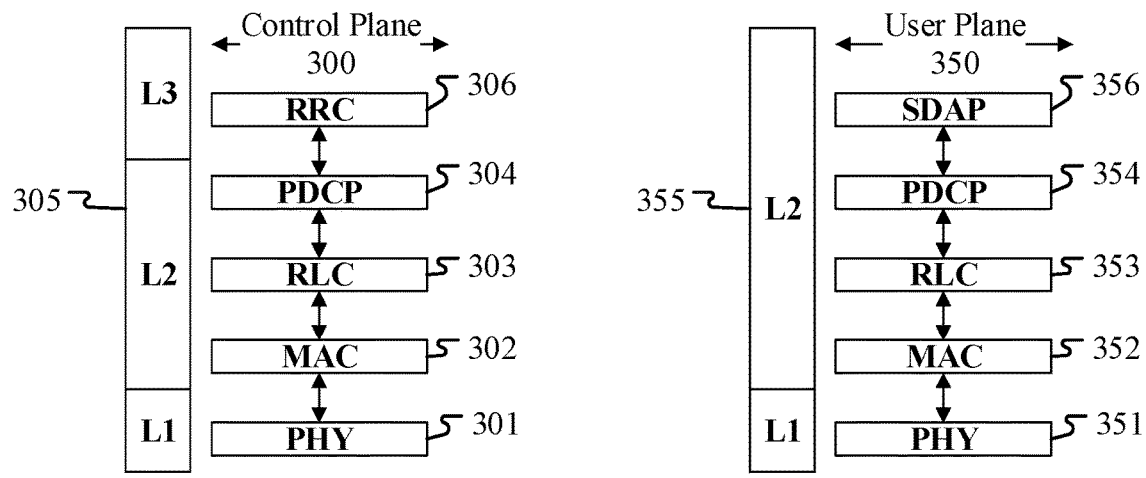
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, or RSU in V2X, or, vehicle-mounted equipment or vehicle-mounted communication module) and a second communication node (gNB, UE, or, vehicle-mounted equipment or vehicle-mounted communication module), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides multiplexing among variable radio bearers and logical channels. The PDCP sublayer 304 provides security by encrypting a packet and provides support for handover of a second node between first nodes. The RLC sublayer 303 provides segmentation and reassembling of a higher-layer packet, retransmission of a lost packet via ARQ. The RLC sublayer 303 also provides detection of duplicate packets and protocol error detection. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, entities of multiple sub-layers of the control plane in FIG. 3 constitute a Signaling Radio Bearer (SRB) vertically.

In one embodiment, entities of multiple sub-layers of the control plane in FIG. 3 constitute a Data Radio Bear (DRB) vertically.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the L2 305 or 355 is part of a higher layer.

In one embodiment, the RRC sublayer in the L3 is part of a higher layer.

In one embodiment, the PDCP sublayer 354 is part of a higher layer.

In one embodiment, the SDAP sublayer 356 is part of a higher layer.

In one embodiment, the L3 is part of a higher layer.

In one embodiment, the action of generating first information in the present disclosure is executed in the MAC sublayer 302 or the 352.

In one embodiment, the first SR in the present disclosure is generated by the PHY 301 or the 351.

In one embodiment, the first SR in the present disclosure is generated by the MAC sublayer 302 or the 352.

In one embodiment, the second SR in the present disclosure is generated by the PHY 301 or the 351.

In one embodiment, the second SR in the present disclosure is generated by the MAC sublayer 302 or the 352.

In one embodiment, the first signaling in the present disclosure is generated by the RRC 306.

In one embodiment, the second signaling in the present disclosure is generated by the RRC 306.

In one embodiment, the second signaling in the present disclosure is generated by the PHY 301 or the 351.

In one embodiment, the second signaling in the present disclosure is generated by the MAC sublayer 302 or the 352.

In one embodiment, the third signaling in the present disclosure is generated by the RRC 306.

In one embodiment, the third signaling in the present disclosure is generated by the PHY 301 or the 351.

In one embodiment, the third signaling in the present disclosure is generated by the MAC sublayer 302 or the 352.

In one embodiment, the fourth signaling in the present disclosure is generated by the RRC 306.

In one embodiment, the fifth signaling in the present disclosure is generated by the RRC 306.

Embodiment 4

Figure 4:
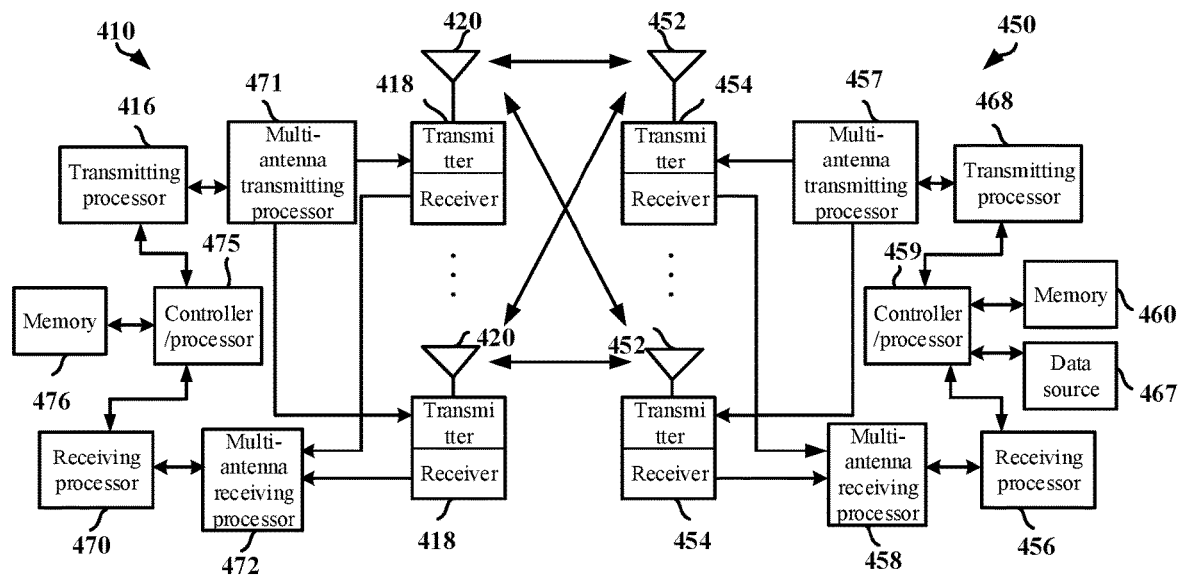
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first communication device 410 comprises at least one processor and at least one memory, the at least one memory comprises computer program codes; the at least one memory and the computer program codes are configured to be used in collaboration with the at least one processor. The first communication device 410 at least comprises: a successful transmission of a first packet is acknowledged by a first entity, the first entity being used for unicast; an instance when a second entity is used for non-unicast does not indicate that the second entity deletes a duplicated first packet; an instance when the second entity is used for unicast indicates that the second entity deletes a duplicated first packet; herein, the first entity and the second entity are associated with a same higher layer entity.

In one embodiment, the first communication device 410 comprises a memory that stores computer readable instruction program, the computer readable instruction program generates actions when executed by at least one processor, which include: a successful transmission of a first packet being acknowledged by a first entity, the first entity being used for unicast; an instance when a second entity is used for non-unicast not indicating that the second entity deletes a duplicated first packet; an instance when the second entity is used for unicast indicating that the second entity deletes a duplicated first packet; herein, the first entity and the second entity are associated with a same higher layer entity.

In one embodiment, the first communication device 410 corresponds to the first node in the present disclosure.

In one embodiment, the second communication device 450 corresponds to the second node in the present disclosure.

In one embodiment, the first node in the present disclosure comprises the first communication device 410, while the second node in the present disclosure comprises the second communication device 450.

In one embodiment, the first communication device 410 is a UE.

In one embodiment, the second communication device 450 is a UE.

In one embodiment, the first communication device 410 is a gNB.

In one embodiment, the second communication device 450 is a gNB.

Embodiment 5

Figure 5:
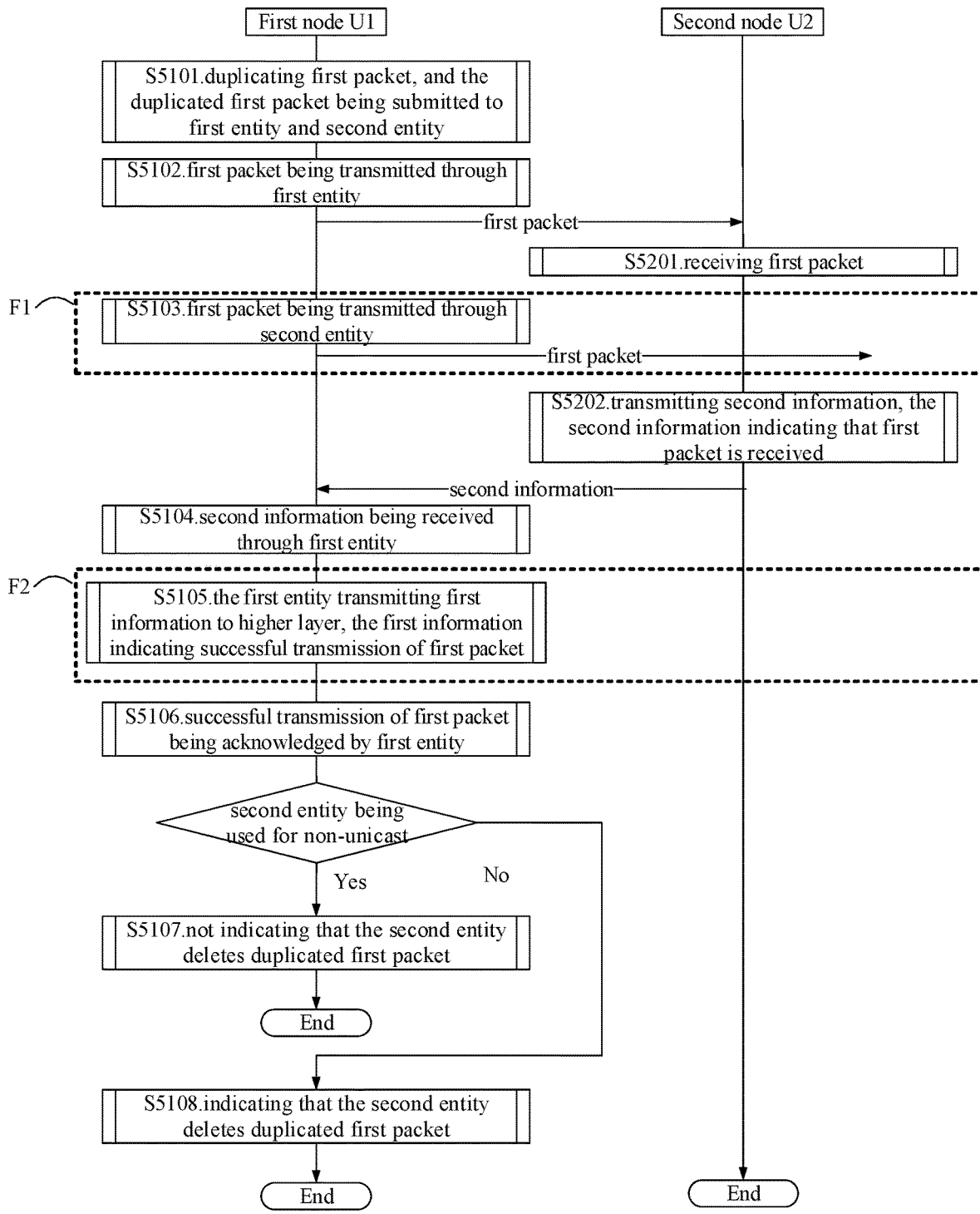
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, the sequence of steps marked by these boxes does not necessarily represent specific chronological order of each step. The steps respectively marked by the dotted-line box F1 and the dotted-line box F2 are optional.

The first node U1 duplicates a first packet in step S5101, the duplicated first packet being submitted to a first entity and a second entity; a first packet is transmitted through a first entity in step S5102; and the first packet is transmitted through a second entity in step S5103; second information is received through the first entity in step S5104; in step S5105, the first entity transmits first information to a higher layer, the first information indicating a successful transmission of the first packet; in step S5106, the successful transmission of the first packet is acknowledged by the first entity; in step S5107, an instance when the second entity is used for non-unicast does not indicate that the second entity deletes a duplicated first packet; in step S5108, an instance when the second entity is used for unicast indicates that the second entity deletes a duplicated first packet;

The second node U2 receives a first packet in step S5201; and transmits second information in step S5202, the second information indicating that the first packet is received;
    herein, the first entity is used for unicast; the first entity and the second entity are associated with a same higher layer entity.

When not comprising the step S5105, the successful transmission of the first packet being acknowledged by the first entity stated in the step S5106 shall be implemented internally within the node.

In one embodiment, the phrase that the first packet is transmitted through a first entity includes that the duplicated first packet is transmitted through a first entity.

In one embodiment, in step S5201 the first packet is received through a counterpart entity of a first entity.

In one embodiment, the phrase that the first packet is transmitted through a second entity includes that the duplicated first packet is transmitted through a second entity.

In one embodiment, the first packet being transmitted through a first entity comprises that the first entity generates a second packet, the second packet comprising the first packet.

In one embodiment, the first packet being transmitted through a second entity comprises that the second entity generates a third packet, the second packet comprising the first packet.

In one embodiment, the second packet is different from the third packet.

In one embodiment, the second packet comprises an RLC PDU.

In one embodiment, the third packet comprises an RLC PDU.

In one embodiment, the first packet being transmitted through a first entity comprises that the first entity generates one or more RLC PDUs, and any of the one or more RLC PDUs comprises the first packet or a segment of the first packet.

In one subembodiment, any of the one or more RLC PDUs generated by the first entity is an RLC Acknowledged Mode Data (AMD) PDU.

In one embodiment, the first packet being transmitted through a second entity comprises that the second entity generates one or more RLC PDUs, and any of the one or more RLC PDUs comprises the first packet or a segment of the first packet, any RLC PDU of the one or more RLC PDUs has a same SN.

In one subembodiment, any of the one or more RLC PDUs generated by the second entity is an RLC AMD PDU.

In one embodiment, the phrase of receiving a first packet comprises receiving the first packet or a slice of the first packet.

In one embodiment, the phrase of receiving a first packet comprises receiving the first packet through a counterpart entity of a first entity.

In one embodiment, the first packet transmitted through the second entity is received by a third entity.

In one subembodiment, the third entity is a counterpart entity of the second entity.

In one subembodiment, the third entity belongs to a second node.

In one subembodiment, the third entity belongs to a communication node different from the second node.

In one embodiment, when the second information is received through a first entity, the first packet has already been transmitted by a second entity.

In one embodiment, when the second information is received through a first entity, the first packet is still not transmitted by a second entity.

In one embodiment, the phrase of transmitting second information comprises that the second information is transmitted through a counterpart entity of a first entity.

In one embodiment, the second information comprises an RLC STATUS PDU.

In one embodiment, the second information comprises an RLC control PDU.

In one embodiment, the second information comprises an RLC PDU.

In one embodiment, the second information comprises a control PDU used for PDCP status report.

In one embodiment, the second information comprises a PDCP control PDU.

In one embodiment, the second information comprises a control PDU.

In one embodiment, the second information comprises a L2 signaling.

In one embodiment, the second information is transmitted on a Physical Uplink Shared Channel (PUSCH).

In one embodiment, the second information comprises one ACK_SN field and zero or multiple NACK_SN fields.

In one embodiment, the phrase of the second information indicating that the first packet is received comprises that the second information comprises an ACK_SN field, and a Sequence Number (SN) of the first packet is smaller than that indicated by the ACK_SN; the second information comprises zero or multiple NACK_SN fields, and the SN of the first packet is unequal to that indicated by any NACK_SN field.

In one subembodiment, the first packet is transmitted through an RLC PDU generated by the first entity, the RLC PDU comprising an SN field, with the SN of the first packet being indicated by the SN field.

In one subembodiment, the first entity generates one or more RLC PDUs, and any of the one or more RLC PDUs comprises the first packet or a segment of the first packet, any of the one or more RLC PDUs comprises an SN field, and the SN fields are of an equal value, with the SN of the first packet being indicated by the SN field.

In one embodiment, the phrase of the second information indicating that the first packet is received comprises that the second information indicates positive acknowledgement of the first packet.

In one embodiment, the phrase that the first entity transmits first information to a higher layer comprises that upon reception of the positive acknowledgement of the first packet, the first entity transmits first information to a higher layer.

In one embodiment, the phrase that second information is received through a first entity comprises that a transmitting side of the first entity receives the second information.

In one embodiment, the phrase that the first entity transmits first information to a higher layer comprises that when the second information indicates that the first packet is received, the first entity transmits first information to a higher layer.

In one subembodiment, the first entity is an RLC entity, and the higher layer is a PDCP layer.

In one subembodiment, a higher layer entity associated with the first entity is the higher layer entity associated with the first entity and the second entity.

In one embodiment, the phrase that a successful transmission of a first packet is acknowledged by a first entity comprises that the higher layer entity associated with the first entity and the second entity receives the first information transmitted by the first entity.

In one embodiment, the phrase that the first entity transmits first information to a higher layer comprises that when the second information indicates that the first packet is received, the first entity transmits first information to a higher layer, and the first entity transmits the first information to a higher layer entity associated with the first entity.

In one subembodiment, the first entity is an RLC entity, and the higher layer entity is a PDCP entity.

In one embodiment, the phrase that a successful transmission of a first packet is acknowledged by a first entity includes that the successful transmission of the first packet is acknowledged through reception of second information by the first entity.

In one embodiment, the phrase of indicating that the second entity deletes a duplicated first packet is implemented by the higher layer entity associated with the first entity and the second entity.

In one embodiment, the first node and the second node are connected by a Uu interface.

Embodiment 6

Figure 6:
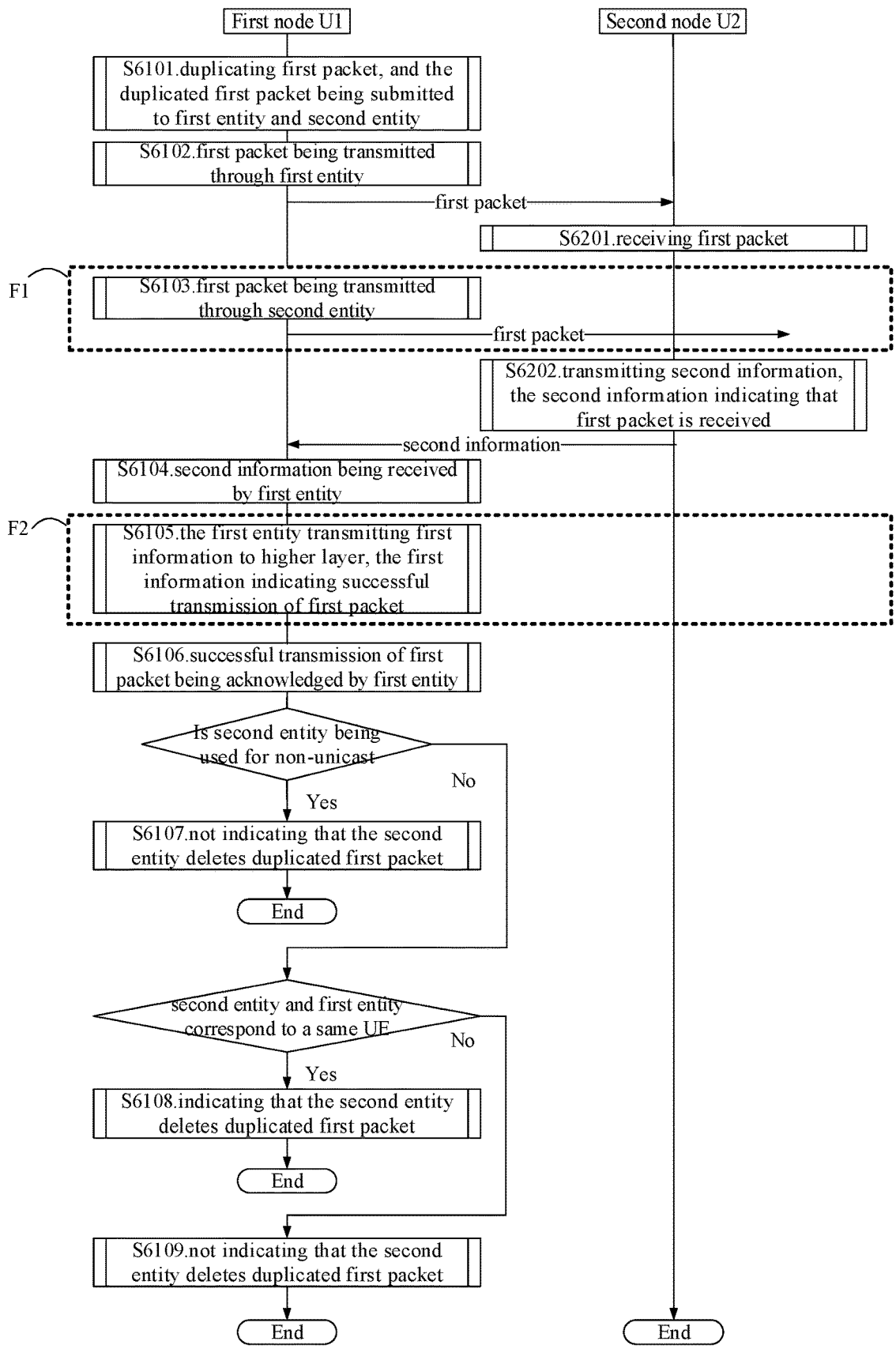
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. In FIG. 6, the sequence of steps marked by these boxes does not necessarily represent specific chronological order of each step. The steps respectively marked by the dotted-line box F1 and the dotted-line box F2 are optional.

The first node U1 duplicates a first packet in step S6101, the duplicated first packet being submitted to a first entity and a second entity; a first packet is transmitted through a first entity in step S6102; and the first packet is transmitted through a second entity in step S6103; second information is received through the first entity in step S6104; in step S6105, the first entity transmits first information to a higher layer, the first information indicating a successful transmission of the first packet; in step S6106, the successful transmission of the first packet is acknowledged by the first entity; in step S6107, an instance when the second entity is used for non-unicast does not indicate that the second entity deletes a duplicated first packet; in step S6108, an instance when the second entity is used for unicast and when the second entity and the first entity correspond to a same UE indicates that the second entity deletes a duplicated first packet; in step S6108, an instance when the second entity is used for unicast and when the second entity and the first entity correspond to different UEs does not indicate that the second entity deletes a duplicated first packet.

The second node U2 receives a first packet in step S6201; and transmits second information in step S6202, the second information indicating that the first packet is received;

herein, the first entity is used for unicast; the first entity and the second entity are associated with a same higher layer entity.

When not comprising the step S6105, the successful transmission of the first packet being acknowledged by the first entity stated in the step S6106 shall be implemented internally within the node.

In one embodiment, the phrase that the second entity and the first entity correspond to different UEs comprises that a counterpart entity of the second entity and a counterpart entity of the first entity respectively belong to different UEs.

In one embodiment, the phrase that the second entity and the first entity correspond to a same UE comprises that a counterpart entity of the second entity and a counterpart entity of the first entity belong to a same UE.

In one embodiment, the phrase that the second entity and the first entity correspond to a same UE comprises that the first entity and the second entity respectively belong to serving cells in different Cell Groups (CGs) of a same UE.

In one embodiment, the phrase that the second entity and the first entity correspond to a same UE comprises that the first entity belongs to a serving cell in a Master Cell Group (MCG), while the second entity belongs to a serving cell in a Secondary Cell Group (SCG) of a same UE.

In one embodiment, the phrase that the second entity and the first entity correspond to a same UE comprises that the second entity belongs to a serving cell in an MCG, while the first entity belongs to a serving cell in an SCG of a same UE.

In one embodiment, the phrase that the second entity and the first entity correspond to a same UE comprises that the first entity and the second entity belong to two serving cells in a same CG of a same UE.

In one embodiment, the phrase that the second entity and the first entity correspond to different UEs comprises that the first entity and the second entity respectively belong to serving cells in different CGs of different UEs.

In one embodiment, the phrase that the second entity and the first entity correspond to different UEs comprises that any higher layer packet transmitted through the first entity and any higher layer packet transmitted through the second entity are respectively identified by two different unicast indexes, the two different unicast indexes being assigned by CGs of different UEs.

In one embodiment, the phrase that the second entity and the first entity correspond to a same UE comprises that any higher layer packet transmitted through the first entity and any higher layer packet transmitted through the second entity are identified by a same unicast index.

In one subembodiment, the same unicast index is assigned by a same CG of a same UE.

In one subembodiment, the unicast index is a C-RNTI.

In one subembodiment, the unicast index comprises 16 bits.

In one subembodiment, a number of bits comprised in the unicast index is a positive integral multiple of 8.

In one subembodiment, the phrase of being identified by a unicast index includes that the unicast index is used to determine time-frequency resources occupied by any higher layer packet.

In one subembodiment, the phrase of being identified by a unicast index includes that the unicast index is used to scramble CRC of any higher layer packet.

In one subembodiment, the unicast index is used to generate an RS sequence of DMRS of any higher layer packet.

In one embodiment, the higher layer entity is associated with at most one lower layer entity used for unicast per user.

In one subembodiment, the higher layer entity is a PDCP entity, and the lower layer entity is an RLC entity.

In one embodiment, the higher layer entity is associated with at least one lower layer entity used for unicast per user.

In one subembodiment, the higher layer entity is a PDCP entity, and the lower layer entity is an RLC entity.

In one embodiment, the present disclosure is advantageous in the following aspects: by receiving the indication that a packed sent by one user through unicast has been transmitted successfully, one can avoid deleting a same packet transmitted by another user through unicast, thus ensuring the traffic continuity of another user; apart from that, such practice also reduces higher layer retransmissions triggered by packet deletion, hence less traffic delay.

Embodiment 7

Figure 7:
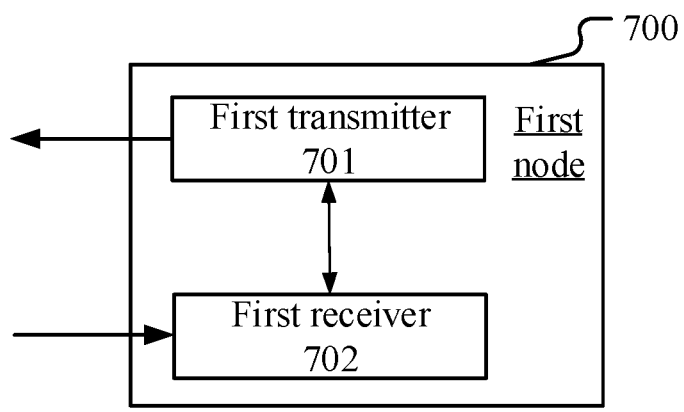
FIG. 7 illustrates a structure block diagram of a processing device in a first node according to one embodiment of the present disclosure.

Embodiment 7 illustrates a structure block diagram of a processing device in a first node according to one embodiment of the present disclosure, as shown in FIG. 7. In Embodiment 7, a first node's processing device 700 comprises a first transmitter 701 and a first receiver 702:

the first receiver 702, in which a successful transmission of a first packet is acknowledged by a first entity, the first entity being used for unicast;

the first transmitter 701, in which a second entity being used for non-unicast does not indicate that the second entity deletes a duplicated first packet; and the second entity being used for unicast indicates that the second entity deletes a duplicated first packet.

In embodiment 7, the first entity and the second entity are associated with a same higher layer entity.

In one embodiment, in the first transmitter 701 an instance when the second entity is used for unicast, and when the first entity and the second entity correspond to a same UE indicates that the second entity deletes a duplicated first packet.

In one embodiment, in the first transmitter 701 an instance when the second entity is used for unicast, and when the first entity and the second entity respectively correspond to different UEs does not indicate that the second entity deletes a duplicated first packet.

In one embodiment, the first entity is an RLC entity, the second entity is an RLC entity, and the higher layer entity is a PDCP entity.

In one embodiment, the phrase of the first entity being used for unicast includes that any higher layer packet transmitted through the first entity is identified by a unicast index.

In one embodiment, the phrase that a second entity is used for non-unicast includes that any higher layer packet transmitted through the second entity is identified by a non-unicast index.

In one embodiment, the phrase that the second entity is used for unicast includes that any higher layer packet transmitted through the second entity is identified by a unicast index.

In one embodiment, the non-unicast refers to at least one of groupcast, broadcast or multicast.

In one subembodiment of the above embodiment, the unicast index is a Cell RNTI (C-RNTI).

In one subembodiment of the above embodiment, the unicast index comprises 16 bits.

In one subembodiment of the above embodiment, the non-unicast index is a Group RNTI (G-RNTI).

In one subembodiment of the above embodiment, the non-unicast index comprises 16 bits.

In one embodiment, the first transmitter 701 comprises the antenna 420, the transmitter 418, the multi-antenna transmitting processor 471, the transmitting processor 416, the controller/processor 475 and the memory 476 in FIG. 4 of the present disclosure.

In one embodiment, the first transmitter 701 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the first receiver 702 comprises the antenna 420, the receiver 418, the multi-antenna receiving processor 472, the receiving processor 470, the controller/processor 475 and the memory 476 in FIG. 4 of the present disclosure.

In one embodiment, the first receiver 702 comprises at least one of the antenna 420, the receiver 418, the multi-antenna receiving processor 472, the receiving processor 470, the controller/processor 475 or the memory 476 in FIG. 4 of the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, aircrafts, unmanned aerial vehicles, telecontrolled diminutive airplanes, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, aircrafts, unmanned aerial vehicles, telecontrolled diminutive airplanes, etc. The third node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, aircrafts, unmanned aerial vehicles, telecontrolled diminutive airplanes, etc. The base station or network-side equipment in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, in which a successful transmission of a first packet is acknowledged by a first entity, the first entity being used for unicast;
   a first transmitter, in which an instance when a second entity is used for non-unicast does not indicate that the second entity deletes a duplicated first packet; an instance when the second entity is used for unicast indicates that the second entity deletes a duplicated first packet;
   wherein the first entity and the second entity are associated with a same higher layer entity; the first entity is an RLC entity, and the second entity is an RLC entity, and the higher layer entity is a PDCP entity.

2. The first node according to claim 1, comprising:
   the first transmitter, in which an instance when the second entity is used for unicast and when the second entity and the first entity correspond to a same User Equipment (UE) indicates that the second entity deletes the duplicated first packet.

3. The first node according to claim 1, wherein the first entity and the second entity being associated with a same higher layer entity comprises that:
   for any higher layer packet that is respectively transmitted through the first entity and the second entity, the higher layer packet has a same sequence number in the first entity and the second entity.

4. The first node according to claim 3, comprising:
   the higher layer packet is a PDCP Data PDU, and the sequence number of the higher layer packet in the first entity and the second entity is indicated by a PDCP SN field in a PDCP Data PDU.

5. The first node according to claim 2, wherein the second entity and the first entity corresponding to a same UE comprises that:
   any higher layer packet transmitted through the first entity and any higher layer packet transmitted through the second entity are identified by a same unicast index.

6. The first node according to claim 5, wherein the unicast index is a C-RNTI.

7. The first node according to any of claim 1, wherein the first entity is an Acknowledged Mode (AM) RLC entity, while the second entity is an Unacknowledged Mode (UM) RLC entity.

8. The first node according to any of claim 2, wherein the first entity is an Acknowledged Mode (AM) RLC entity, while the second entity is an Unacknowledged Mode (UM) RLC entity.

9. The first node according to any of claim 3, wherein the first entity is an Acknowledged Mode (AM) RLC entity, while the second entity is an Unacknowledged Mode (UM) RLC entity.

10. The first node according to any of claim 4, wherein the first entity is an Acknowledged Mode (AM) RLC entity, while the second entity is an Unacknowledged Mode (UM) RLC entity.

11. The first node according to any of claim 5, wherein the first entity is an Acknowledged Mode (AM) RLC entity, while the second entity is an Unacknowledged Mode (UM) RLC entity.

12. The first node according to any of claim 6, wherein the first entity is an Acknowledged Mode (AM) RLC entity, while the second entity is an Unacknowledged Mode (UM) RLC entity.

13. A method in a first node for wireless communications, comprising:
    a successful transmission of a first packet being acknowledged by a first entity, the first entity being used for unicast;
    an instance when a second entity is used for non-unicast does not indicate that the second entity deletes a duplicated first packet; an instance when the second entity is used for unicast indicates that the second entity deletes a duplicated first packet;
    wherein the first entity and the second entity are associated with a same higher layer entity; the first entity is an RLC entity, and the second entity is an RLC entity, and the higher layer entity is a PDCP entity.

14. The method in the first node according to claim 13, comprising:
    an instance when the second entity is used for unicast and when the second entity and the first entity correspond to a same UE indicates that the second entity deletes the duplicated first packet.

15. The method in the first node according to claim 13, wherein the first entity and the second entity being associated with a same higher layer entity comprises that:
    for any higher layer packet that is respectively transmitted through the first entity and the second entity, the higher layer packet has a same sequence number in the first entity and the second entity.

16. The method in the first node according to claim 15, comprising:
    the higher layer packet is a PDCP Data PDU, and the sequence number of the higher layer packet in the first entity and the second entity is indicated by a PDCP SN field in a PDCP Data PDU.

17. The method in the first node according to claim 14, wherein the second entity and the first entity corresponding to a same UE comprises that:
    any higher layer packet transmitted through the first entity and any higher layer packet transmitted through the second entity are identified by a same unicast index.

18. The method in the first node according to claim 17, wherein the unicast index is a C-RNTI.

19. The first node according to any of claim 13, wherein the first entity is an AM RLC entity, while the second entity is an UM RLC entity.

20. The first node according to any of claim 14, wherein the first entity is an AM RLC entity, while the second entity is an UM RLC entity.

* * * * *